(12) United States Patent
Tachiwa

(10) Patent No.: US 10,481,842 B2
(45) Date of Patent: Nov. 19, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/999,009

(22) Filed: Aug. 20, 2018

(65) Prior Publication Data
US 2019/0065126 A1    Feb. 28, 2019

(30) Foreign Application Priority Data

Aug. 29, 2017  (JP) .................................. 2017-164597

(51) Int. Cl.
| | | |
|---|---|---|
| *H04N 1/04* | (2006.01) | |
| *G06F 3/12* | (2006.01) | |
| *H04W 48/14* | (2009.01) | |
| *H04L 29/08* | (2006.01) | |
| *H04W 8/00* | (2009.01) | |
| *H04W 84/12* | (2009.01) | |
| *H04W 88/06* | (2009.01) | |

(52) U.S. Cl.
CPC .......... *G06F 3/1226* (2013.01); *G06F 3/1204* (2013.01); *G06F 3/1231* (2013.01); *G06F 3/1292* (2013.01); *H04L 67/16* (2013.01); *H04W 8/005* (2013.01); *H04W 48/14* (2013.01); *H04W 84/12* (2013.01); *H04W 88/06* (2013.01)

(58) Field of Classification Search
CPC .... G06F 3/1226; G06F 3/1231; G06F 3/1204; G06F 3/1292

USPC ........................................................ 358/1.15
See application file for complete search history.

(56) References Cited

U.S. PATENT DOCUMENTS

| | | |
|---|---|---|
| 7,317,712 B2 | 1/2008 | Ishimura |
| 8,831,007 B2 | 9/2014 | Asai et al. |
| 9,949,270 B2 | 4/2018 | Tachiwa |

(Continued)

FOREIGN PATENT DOCUMENTS

| | | |
|---|---|---|
| EP | 3098704 A1 | 11/2016 |
| EP | 3148230 A1 | 3/2017 |

(Continued)

OTHER PUBLICATIONS

"Enabling Always On Service Discover: WiFi Neighbor Awareness Networking", Camps-Mur et al., IEEE Wireless Communications, Apr. 2015.

(Continued)

*Primary Examiner* — Houshang Safaipour
(74) *Attorney, Agent, or Firm* — Venable LLP

(57) ABSTRACT

A communication apparatus, which has a first communication function for executing communication based on a Neighbor Awareness Network (NAN) and a second communication function for executing communication by a wireless LAN by sharing at least a part of a communication circuit with the first communication function, searches a printer by determining whether a value of a Service ID or a value of Service Info of a NAN Attribute included in a Publish message received by the first communication function is a value indicating a print service, and transmits print data to a printer discovered by the search.

22 Claims, 12 Drawing Sheets

(56) References Cited

U.S. PATENT DOCUMENTS

| | | | |
|---|---|---|---|
| 10,057,845 B2* | 8/2018 | Saeki | B41J 29/00 |
| 2006/0039336 A1 | 2/2006 | Ishimura | |
| 2014/0355048 A1 | 12/2014 | Kang et al. | |
| 2016/0360477 A1 | 12/2016 | Saeki et al. | |
| 2017/0034769 A1 | 2/2017 | Kim et al. | |
| 2018/0035363 A1* | 2/2018 | Gupta | H04W 48/16 |
| 2018/0242303 A1 | 8/2018 | Tachiwa | |

FOREIGN PATENT DOCUMENTS

| | | | |
|---|---|---|---|
| JP | 2006060578 A | 3/2006 | |
| JP | 2015200989 A | 11/2015 | |

OTHER PUBLICATIONS

European Search Report issued in corresponding European Application No. 18188313.3 dated Dec. 13, 2018.

* cited by examiner

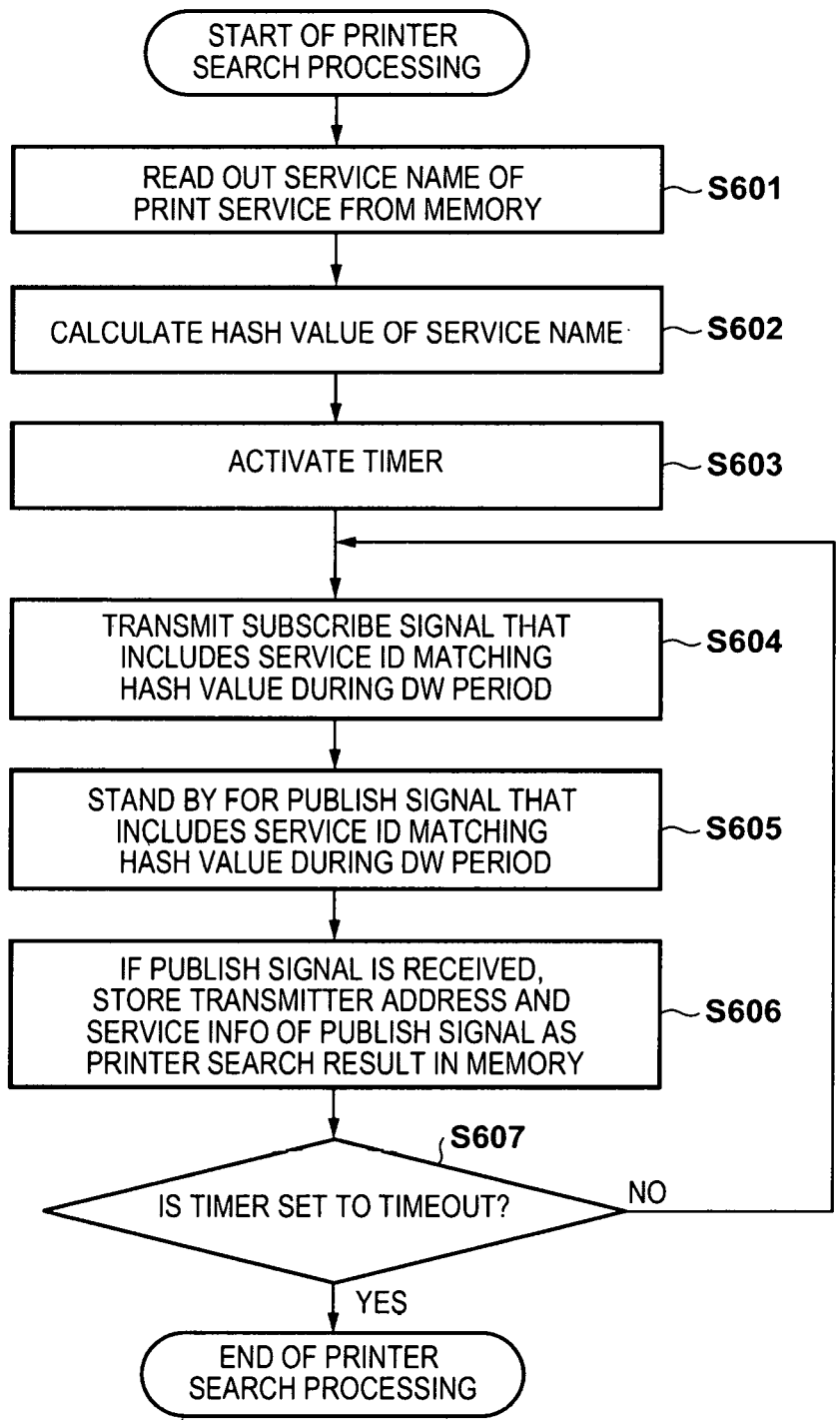

FIG. 7

Transmitter Address (TA) | CONTENTS OF NAN Attribute

| | |
|---|---|
| 01-23-45-67-89-AA | PRINTER NAME = "13TH FLOOR OFFICE NORTH-SIDE PRINTER", BSSID=AA-AA-AA-AA-AA-AA |
| 01-23-45-67-89-BB | PRINTER NAME = "13TH FLOOR OFFICE SOUTH-SIDE PRINTER", BSSID=BB-BB-BB-BB-BB-BB |
| 01-23-45-67-89-CC | PRINTER NAME = "13TH FLOOR OFFICE EAST-SIDE PRINTER", BSSID=CC-CC-CC-CC-CC-CC |
| 01-23-45-67-89-DD | PRINTER NAME = "13TH FLOOR OFFICE WEST-SIDE PRINTER", BSSID=DD-DD-DD-DD-DD-DD |

FIG. 8A

| NEARBY PRINTERS |
|---|
| 13TH FLOOR OFFICE NORTH-SIDE PRINTER |
| 13TH FLOOR OFFICE SOUTH-SIDE PRINTER |
| 13TH FLOOR OFFICE EAST-SIDE PRINTER |
| 13TH FLOOR OFFICE WEST-SIDE PRINTER |

FIG. 8B

| NEARBY DEVICES |
|---|
| PRINTERS |
| 13TH FLOOR OFFICE NORTH-SIDE PRINTER |
| 13TH FLOOR OFFICE SOUTH-SIDE PRINTER |
| 13TH FLOOR OFFICE EAST-SIDE PRINTER |
| 13TH FLOOR OFFICE WEST-SIDE PRINTER |
| |
| PROJECTORS |
| CONFERENCE ROOM A PROJECTOR |
| CONFERENCE ROOM B PROJECTOR |
| |
| LOUDSPEAKER |
| ... |

COMMUNICATION APPARATUS, CONTROL METHOD, AND STORAGE MEDIUM

BACKGROUND OF THE INVENTION

Field of the Invention

The present invention relates to a communication partner search and connection control technique.

Description of the Related Art

A communication function by a wireless LAN which is in compliance with the IEEE802.11 standard series is widely used to provide a printer service and the like. In Japanese Patent Laid-Open No. 2006-060578, there is disclosed a technique of securely establishing a wireless LAN connection between a printer and a user device and transmitting print data by the established connection. Also, in Japanese Patent Laid-Open No. 2015-200989, there is disclosed a method of detecting, by using Bluetooth® Low Energy (BLE), a printer which is capable of establishing a wireless LAN connection and establishing the wireless LAN connection with the detected printer.

According to the technique disclosed in Japanese Patent Laid-Open No. 2015-200989, power saving can be achieved since a connectable printer is detected by using BLE before a wireless LAN connection is established. Note that in order to use this method, the two apparatuses which are to execute the communication are both required to not only have a wireless LAN communication function but also a BLE communication function. However, since BLE and a wireless LAN have different physical layer signal formats and packet structures, separate communication circuits need to be prepared to make each communication apparatus capable of using both of these communication functions, and thus the component cost is increased.

SUMMARY OF THE INVENTION

The present invention can implement establishment of wireless connection between apparatuses with low power consumption while suppressing the cost of each apparatus.

According to one aspect of the present invention, there is provided a communication apparatus comprising: a first communication unit configured to execute communication based on a Neighbor Awareness Network (NAN); a search unit configured to search a printer by determining whether a value of a Service ID or a value of Service Info of a NAN Attribute included in a Publish message received by the first communication unit is a value indicating a print service; and a second communication unit, which is a communication unit configured to execute communication by a wireless LAN by sharing at least a part of a communication circuit with the first communication unit, configured to transmit print data to a printer discovered by the search unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a flowchart showing an example of the procedure of printer search processing;

FIG. 7 is a view showing an example of information stored as a printer search result;

FIGS. 8A and 8B are views each showing an example of screen display for accepting a printer selection operation;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that in the following embodiment, communication is performed between a user device and printer each having a wireless LAN communication function in compliance with the IEEE802.11 standard series. At this time, the user device detects the printer by using a Neighbor Awareness Network (NAN) of Wi-Fi Alliance and transmits print data to the detected printer by using a wireless LAN. Since communication is executed intermittently in NAN communication by setting a Discovery Window (DW) for a predetermined short period at a predetermined cycle, it is possible to suppress power consumption. As NAN communication is communication complying with the IEEE802.11 standard series, it can be executed by using a communication circuit for another type of communication in a wireless LAN that complies with the IEEE802.11 standard series. Hence, compared to a case that uses a communication method which does not allow communication circuit sharing such as BLE or the like, the cost of the communication apparatus can be suppressed. The arrangement of the system and the apparatus will be described first, and some examples of processing procedures will be subsequently described below.

(System Arrangement)

Figure 1:
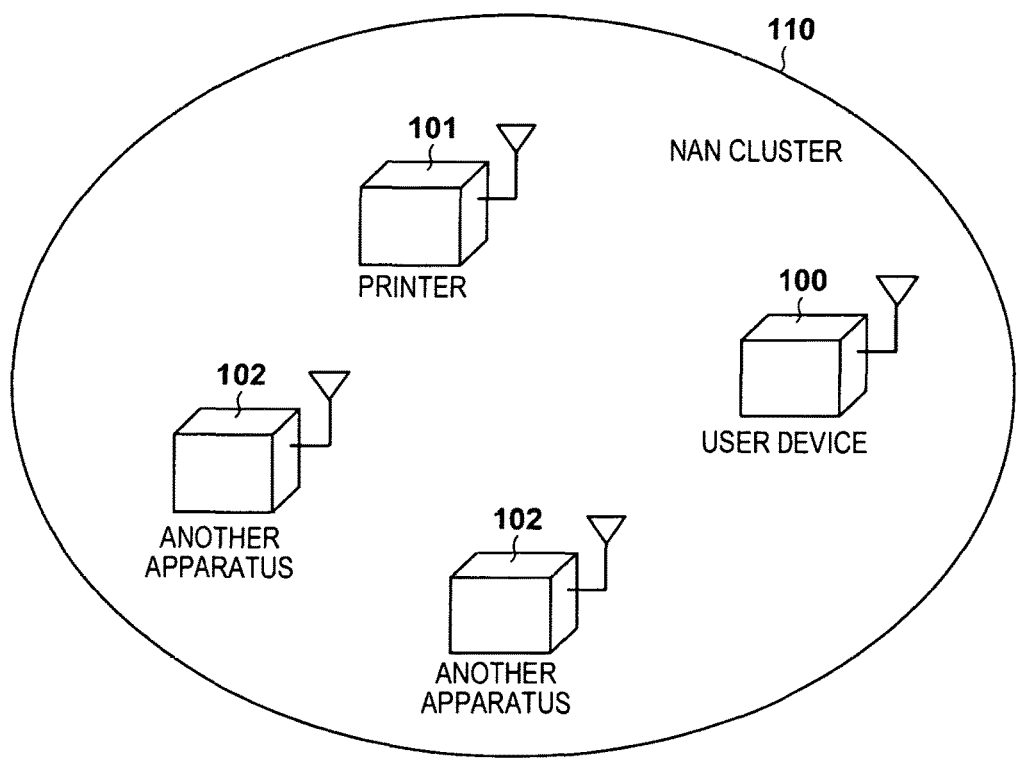
FIG. 1 is a view showing an example of the arrangement of a system.

FIG. 1 is a view showing an example of the system arrangement of a wireless communication system according to this embodiment. The wireless communication system includes, for example, a user device 100, a printer 101, and another apparatus 102. These apparatuses are merely examples of communication apparatuses in the embodiment. In the embodiment, these apparatuses all comply with the IEEE802.11 standard series and have a low-power consumption NAN communication function and a relatively high-power consumption wireless. LAN communication function. Note that each apparatus may have a wireless communication function by a wireless communication standard other than the IEEE802.11 standard series. That is, the following description is applicable to a communication apparatus that supports a plurality of wireless communication methods by which sharing of wireless communication hardware is possible and in which at least one method is a low-power consumption wireless communication method.

The user device 100 is, for example, a battery-driven mobile device which includes a user interface such as a liquid crystal screen, a touch panel, and the like. However, the present invention is not limited to this. For example, the user device 100 may be any arbitrary portable or desktop apparatus that has a communication function and is connected to a main power supply or is battery driven. A mobile device that can be used as the user device 100 is, for example, a smartphone, a mobile phone, a tablet personal computer (PC), a laptop PC, a notebook PC, or a portable game device. In this embodiment, the user device 100 also has a function to search for a nearby printer and to cause the detected printer to perform printing by transmitting content data such as an image. Processing operations executed by the user device 100 in order to implement this function can be implemented by causing hardware such as a processor and the like to operate an operating system (OS) and application software operating on the OS.

The printer 101 provides a print service to other apparatuses such as the user device 100 and the like. Note that the printer 101 may not only have a wireless communication function but also a wired communication function and may provide a print service in accordance with a print request made by an apparatus which is connected to the printer via a wired network. Note that although the embodiment will describe an example using the printer 101 which provides a print service, the printer 101 may be substituted by an apparatus that provides another arbitrary service such as a storage apparatus that executes a storage service for data accumulation.

As described above, the user device 100 executes communication related to a printer search by the low-power consumption NAN and executes communication related to print data transmission by the high-speed and relatively high-power consumption wireless LAN. NAN communication between the user device 100 and a search target printer is executed as bidirectional communication in a DW which is set as a periodically arriving period of a predetermined length in the 2.4-GHz frequency bandwidth channel 6 (2.437 GHz). Note that a set of communication apparatuses which share a DW schedule is called a NAN cluster. The DW is set as a period of 16 TU for every 512 TU. Note that "TU" is the acronym of a "Time Unit", and 1 TU equals 1024 μsec. When the user device 100 and the printer 101 belong to a same NAN cluster 110, the user device 100 can communicate with the printer 101 during the DW period. Note that one or more other apparatuses 102 can belong to the same NAN cluster 110 in FIG. 1.

The NAN cluster includes an apparatus that operates as a Master to repeatedly transmit a Discovery Beacon, which is a signal to cause a terminal that does not belong to the NAN cluster to recognize the NAN cluster. The Discovery Beacon is transmitted, for example, at a timing other than the DW period at every 100 ms. The apparatus that operates as a Master also transmits, during the DW period, a Synchronization Beacon (to be referred to as a Sync Beacon hereinafter) which is a beacon for each terminal to recognize the DW and execute synchronization. Although roles other than the Master, such as a Non-Master Sync, Non-Master Non-Sync, and the like are defined in the NAN, a description will be omitted in this case.

In this embodiment, assume that the printer 101 operates as a Master in the NAN cluster 110. The user device 100 recognizes the NAN cluster 110 by receiving a Discovery Beacon from the printer 101 and further detects the DW period of the NAN cluster 110 by receiving a Sync Beacon. Note that since changing the apparatus that is to operate as a Master in the NAN cluster is permitted, it is possible for the user device 100 to subsequently operate as a Master. The NAN cluster 110 may also be formed by the user device 100 transmitting a Discovery Beacon as a Master and a nearby printer receiving the Discovery Beacon. The other apparatus 102 may also operate as a Master, and the printer 101 and the user device 100 may join the NAN cluster 110 upon receiving the Discovery Beacon transmitted from the other apparatus 102.

The user device 100 and the printer 101 exchange information related to the presence/absence of a print service during the DW period of the NAN cluster 110. The user device 100 notifies the printer of Its search for a device providing a print service by transmitting a Subscribe message which is a message for requesting or detecting a service. In response, the printer 101 notifies the user device 100 that it is providing the print service by transmitting a Publish message, which is a message to notify the user device of the provision of the service, during the DW period. The user device 100 and the printer 101 may further exchange additional information by a Follow-up message. Messages such as a Publish message, Subscribe message, and a Follow-up message each are transmitted in a frame format called a Service Discovery Frame (SDF). Note that if the user device 100 is to search for a device that is providing a service which is not the print service, the user device transmits a Subscribe message designating the service. In response, the device providing the designated service transmits a Publish message indicating that it is providing the designated service.

Figure 2:
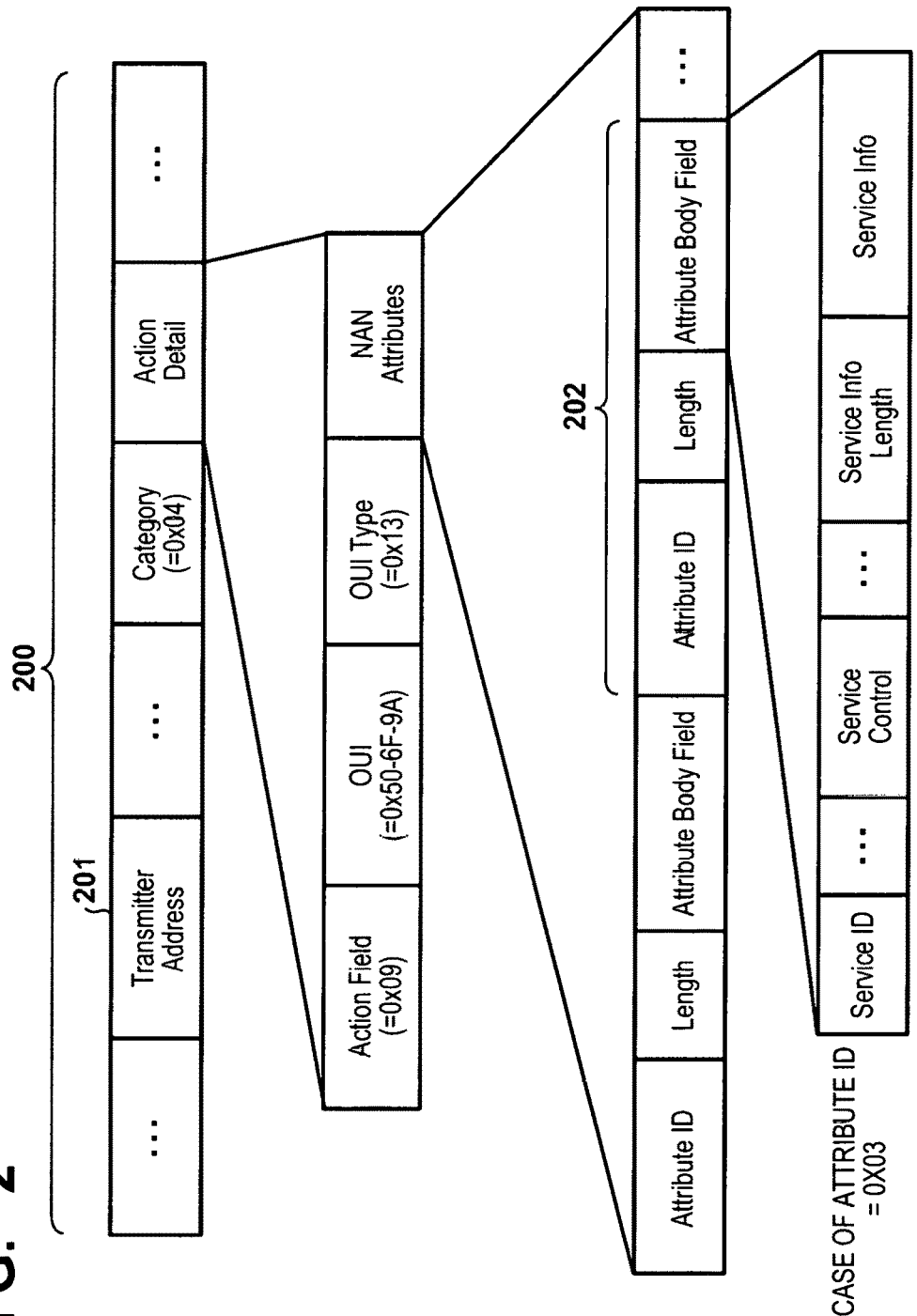
FIG. 2 is a view showing an SDF frame configuration.

FIG. 2 shows the frame configuration of an SDF 200. The SDF 200, which is a type of a MAC frame defined by the IEEE802.11 standard series, includes a transmitter address 201 which is the address of the transmission source NAN device and one or more NAN attributes 202. Note that a Transmitter Address will be represented as TA. There are a plurality of types of NAN Attributes. The types of NAN Attributes are defined by Attribute IDs, and the contents of an Attribute Body Field are set for each type. When the value of an Attribute ID is 0x03, the NAN Attribute is called a Service Descriptor Attribute. The Attribute Body Field of the Service Descriptor Attribute includes fields for a Service ID, Service Control, and Service Info. The Service ID can include information representing the type of a service such as a print service or the like. The Service Control can include information representing a type of a message such as the Publish message, the Subscribe message, or the Follow-up message. The Service Info can include arbitrary information. A NAN Attribute for transmitting other pieces of information is also defined.

Upon receiving a Publish message indicating the provision of a print service from the printer 101 during the DW period, the user device 100 establishes a wireless LAN connection separate from the NAN with the printer 101. For example, the printer 101 can operate as a wireless LAN access point (AP), and the user device 100 can operate as a wireless LAN station (STA) to connect to the printer 101. Note that it is possible for the printer 101 to operate as a STA and the user device 100 to operate as an AP or for both the printer 101 and the user device 100 to operate as STAs to connect to an external AP. That is, it is sufficient to execute communication by setting one of the user device 100 and the printer 101 to operate as an access point and the other to operate as a station, and there is no restriction as to which apparatus is to operate as an access point. Furthermore, the user device 100 and the printer 101 may establish a P2P connection (direct connection) based on the Wi-Fi Direct standard. This operation of establishing a wireless connection for data communication by a network separate from a NAN after discovering the connection partner by the NAN is generally called a Post NAN. The user device 100 and the printer 101 use a Post NAN wireless connection to transfer print data from the user device 100 to the printer 101. Note that it may be arranged so that the user device 100 and the printer 101 will exchange pieces of timing information by executing communication during the DW period of NAN and will execute print data communication in a period other than the DW period based on the exchanged timing information. That is, instead of transmitting the print data by using the Post NAN wireless connection, the print data may be transmitted by using NAN communication. At this time, the frequency channel (for example, channel 6) used in DW communication may continue to be used or a different frequency channel may be used. Using a different frequency channel can suppress the influence of signal interference even if a part of the print data communication period overlaps with the DW.

In a case in which the Post NAN is used for print data transmission, the user device 100 and the printer 101 exchange, by using SDFs, information required for establishing the Post NAN wireless connection based on the NAN standard. For example, if the printer 101 serves as a wireless LAN AP, the printer 101 includes a WLAN Infrastructure Attribute, which is a type of a NAN Attribute, in the SDF. The printer 101 transmits the SDF which includes a Basic Service Set Identifier (BSSID) in its Attribute Body Field. The user device 100 establishes a wireless LAN connection by using these pieces of information included in the received SDF. The BSSID may be included in the Service Info in the Service Descriptor Attribute which is another type of a NAN Attribute. Also, pieces of connection setting information, other than the BSSID, required for establishing a wireless connection can be exchanged by using SDFs based on the NAN standard.

(Arrangement of User Device)

Figure 3:
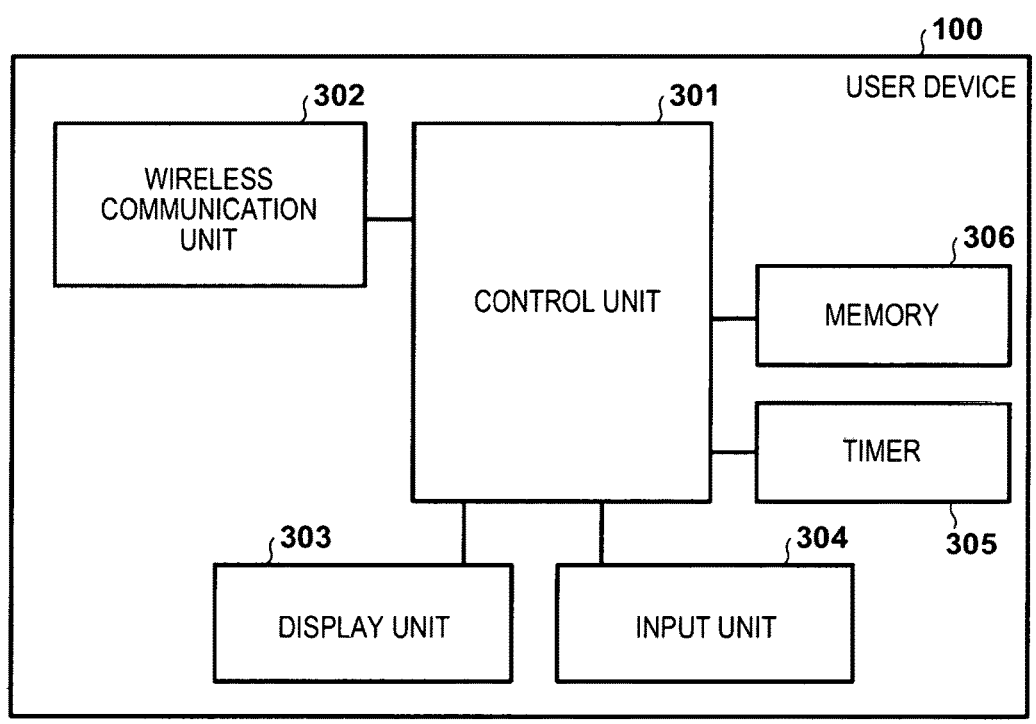
FIG. 3 is a block diagram showing an example of the arrangement of a user device.

An example of the arrangement of the user device 100 will be described next with reference to FIG. 3. The user device 100 includes, in one example, a control unit 301, a wireless communication unit 302, a display unit 303, an input unit 304, a timer 305, and a memory 306.

The control unit 301 is formed by, for example, at least one or more processors and controls the overall user device 100 by executing control programs stored in the memory 306. A processor is, in one example, a central processing unit (CPU) or a micro processing unit (MPU) but is not limited to this. For example, a field programmable gate array (FPGA) or a digital signal processor (DSP) may be used as a processor. The control unit 301 can be, for example, formed so as to automatically generate and execute a dedicated circuit on a gate array such as an FPGA by using a program corresponding to a predetermined compiler and predetermined processing. The control unit 301 may be formed by combining a plurality of processors so that, for example, some of the processes are implemented by an FPGA or the like and other processes are implemented by a CPU or the like. Note that the control unit 301 can use one or more memories 306 in accordance with various kinds of situations in which information is to be stored such that a value of a variable is to be stored while executing a control program. Information may also be stored in storage devices other than the memory 306 or in a memory incorporated in the control unit 301. The control unit 301 can measure time by using the timer 305.

The wireless communication unit 302 performs at least one of data transmission and reception with another apparatus (for example, the printer 101) by a communication method complying with the wireless LAN and the NAN standard under the control of the control unit 301. The wireless communication unit 302 has, for example, an antenna, a modulation and demodulation circuit, a processor for media access control, and the like which are components and functions necessary for executing communication by the wireless LAN and the NAN. As described above, at least some of the components such as the communication circuit, the antenna, and the like forming the wireless communication unit 302 are shared in the wireless LAN communication and the NAN communication.

The display unit 303 visually displays, to a user, pieces of arbitrary information including content information such as an image, information necessary for the user to operate the user device 100 by using the input unit 304, and the like under the control of the control unit 301. The display unit 303 is, for example, a liquid crystal screen or an organic EL display. Note that instead of or in addition to a display, the display unit 303 may further include a loudspeaker and a vibrator that presents information to the user by auditory and tactile senses. The input unit 304 can be arbitrary hardware that has an acceptance function of accepting an operation made by the user. The input unit 304 may be, for example, a keyboard and a mouse. A touch panel display integrating the input unit 304 and the display unit 303 may also be used. The timer 305 is, for example, a general timer that starts a time measurement operation in accordance with a signal provided by the control unit 301 and measures the elapsed time from the start of the time measurement operation. The memory 306 holds various kinds of information such as a control program of the control unit 301, the value of each variable output during execution of the control program by the control unit 301, content information such as an image, and the like.

(Processing Procedure)

Some examples of processing procedures which are to be executed in the arrangement of the above-described system and apparatus will be described next mainly from the viewpoint of the user device 100. The processing is started, for example, in accordance with the execution of a predetermined application in the user device 100.

Processing Example 1

The first example of processing to be executed by the user device 100 will be described with reference to FIG. 4. When the processing is started, the control unit 301 sets the wireless LAN to an OFF state by controlling the wireless communication unit 302 and stands by for a user to make a printer search operation (steps S401 and S402). Note that although only one of the communication functions of the wireless LAN such as the high-speed large capacity communication function may be the target to be turned off here, the NAN communication function may also be turned off. The control unit 301 ends the processing of FIG. 4 when it determines, in step S402, that an application end operation or predetermined end processing related to a predetermined service such as printing has been performed. An example of the display contents of the display unit 303 at this time will be described with reference to FIGS. 5A and 5B. A screen 500 shown in FIG. 5A is the display contents of the display unit 303 when a predetermined application X has been executed and the image contents have been displayed. The processing of FIG. 4 can be started, for example, in response to the start of this application X or the execution of a predetermined process such as the display of the image content in the application X. When a menu button 501 for operating the displayed image content is tapped, the control unit 301 performs control so as to cause the display unit 303 to shift to a screen 502 shown in FIG. 5B and display a menu. In addition, when a print button 503 of the menu is tapped, the control unit 301 determines that a printer search operation has been performed by the user.

Upon detecting the printer search operation, the control unit 301 controls the wireless communication unit 302 to join a NAN cluster and causes the wireless communication unit to detect a DW period by receiving a Discovery Beacon and a Sync Beacon (step S403). Next, the control unit 301 controls the wireless communication unit 302 to search for a printer present in the NAN cluster by the communication executed during the DW period (step S404). The printer search processing which is to be executed in step S404 will be described here with reference to FIG. 6.

First, the control unit 301 reads out a character string that represents the print service which is held beforehand in the memory 306 (step S601). This character string is a character string called a Service Name in the NAN standard. The character string can be, for example, "print_service", but another character string may be used. For example, a character string that includes a domain name such as "org.organization_xxx.print_service" may be used. Next, the control unit 301 calculates a hash value of this character string (step S602). The control unit 301 can regard, for example, the character string as an input of a hash function SHA-256 and set, as the hash value, the initial 48 bits (6 bytes) of the hash function output result. Note that it may be set so that the hash value calculation is performed by the wireless communication unit 302 instead of the control unit 301. The hash value may also be calculated by another calculation method. In addition, in some cases, a predetermined value which corresponds to the character string but is not a hash value, such as the character string itself or the like may be used.

Next, the control unit 301 activates the timer (step S603) and repetitively executes the processes of the following steps S604 to S607 for a predetermined period. In step S604, the predetermined period is 10 sec. However, the present invention is not limited to this and an arbitrary length of time may be used as the predetermined period. The control unit 301 controls the wireless communication unit 302 and causes the wireless communication unit to transmit a Subscribe message in the DW period (step S604). Information specifying that the message is a Subscribe message to the Service Control is set in the Subscribe message here, and the message is transmitted by SDF which includes a Service ID matching the hash value acquired in step S602.

Next, the control unit 301 controls the wireless communication unit 302 to receive a Publish message which includes the Service ID matching the above-described hash value in the DW period (step S605). For example, if the wireless communication unit 302 has a filtering function based on the Service ID, it can be set so that a Publish message whose Service ID does not include the above-described hash value will be shutout. Upon receiving a Publish message with a matching Service ID, the wireless communication unit 302 notifies the control unit 301 of its reception. Upon receiving the notification from the wireless communication unit 302, the control unit 301 determines that the transmission source apparatus of this Publish message is a printer that is providing a print service. The control unit 301 associates the TA of this Publish message and the contents of the NAN Attribute received from the same TA and stores the associated information in the memory 306 to save this as a printer search result. The control unit 301 ends the processing of FIG. 6 after executing the processes of steps S604 to S607 for a predetermined period.

Note that in the NAN standard, two operations are defined as the transmission method of a Publish message. The operations are a Solicited Publish operation, in which a Publish signal is transmitted in response to a Subscribe signal, and an Unsolicited Publish operation, in which a Publish signal is repeatedly transmitted without a Subscribe signal. If only a printer that is executing an Unsolicited Publish operation is to be searched for in the processing of FIG. 6, the transmission of the Subscribe message in step S604 may be omitted.

FIG. 7 shows an example of a printer search result 700 which is stored in the memory by the printer search processing of step S404. For example, assume that a Publish message which includes a Service ID matching the hash value calculated in step S602 has been received from an apparatus whose TA=01-23-45-67-89-BB. In addition, assume that the Service Info of this Publish message includes a character string "13th floor office south-side printer" as information representing the printer name. Assume also that information indicating BSSID="BB-BB-BB-BB-BB-BB" has been received as a WLAN Infrastructure Attribute as a NAN Attribute from the transmission source with the same TA. In this case, as shown by information 701, information acquired by associating the TA, the printer name, and the BSSID is stored in the memory 306. If similar pieces of information are received from apparatuses of other TAs, pieces of information like those of the information 701 are stored for each TA. The contents of the NAN Attribute to be stored can be all or some of the pieces of the received information. The printer search result 700 of FIG. 7 is an example of a case in which four printers have been discovered.

Returning to FIG. 4, if one or more printers have been detected by the printer search processing (YES in step S405), the control unit 301 causes the display unit 303 to display a printer selection screen based on the search result, and stands by for the user to select a connection destination printer (step S406). The control unit 301 controls the wireless communication unit 302 so as to turn on the high-speed large-capacity communication function of the wireless LAN which had been turned off in step S401, and establishes (step S407) a wireless LAN connection, which is separate from the NAN, with the user-selected printer. Note that if a printer is not detected (NO in step S405) in the printer search processing (step S404), the control unit 301 notifies the user (step S409) by presenting, for example, information that a printer was not discovered via the display unit 303 and returns the process to step S401.

FIG. 8A shows an example of a printer selection screen 800 that is displayed in step S406. In the printer selection screen 800, the printer name information of each NAN Attribute stored as the printer search result 700 is displayed in a list in accordance with the corresponding TA. These pieces of information may be displayed in an arbitrary order such as in alphabetical order, character code order, or the like. The control unit 301 may store, in the memory 306, a TA that has been selected previously by the user and execute a display operation in a format facilitating the selection by showing the TA that has been selected previously at the top of the list or the like. That is, display control based on past connection history information can be performed. Upon detecting that the user has tapped a piece of information 801 among the displayed pieces of information, the control unit 301 refers to the corresponding information 701 of the printer search result 700 and obtains the BSSID corresponding to the information 701. The control unit 301 controls the wireless communication unit 302 to transmit a Probe Request using this BSSID as the address. The wireless communication unit 302 subsequently receives a Probe Response and establishes the wireless LAN connection by executing procedures for Authentication and Association. Note that procedures for establishing a wireless LAN connection such as the transmission of a Probe Request and the like are the same as the procedures for a general wireless LAN connection, and thus a description will be omitted. Note that as the security key to be used here, the wireless communication unit 302 may use a key received from the printer 101 by a NAN Attribute or may use a key acquired by user input via the input unit 304. The acquired security key may be associated with the BSSID and held in the memory 306. In this case, the wireless communication unit 302 can refer to the memory 306 when later connecting to the printer of the same BSSID so that second and subsequent user inputs can be omitted.

Note that as the screen to be displayed in step S406, the control unit 301 may display a screen 810 which includes not only printers but also other types of devices in the search result as shown in FIG. 8B. Each type of device other than the printer is searched by setting a character string corresponding to a service other than the printer service, such as that for a projector, a loudspeaker, or the like, as the character string to be input in the hash value calculation used in the processes of steps S604 and S605 in FIG. 6. Other processes are the same as those for the printer search processing. At this time, since the search processing is performed for each character string, the control unit 301 can display the search results for the printers and other devices separately as shown in the screen 810. In step S406, instead of displaying the search result after waiting for the timeout to elapse in step S607, it may be set so that the search result is displayed each time an apparatus which provides the desired service is discovered. In this case, for example, the search result list displayed in FIG. 8A will be updated and displayed in real time. By displaying the search result list in this manner, it allows the user to select a printer to be used without waiting for the timeout to elapse in step S607.

After the wireless LAN connection has been established in step S407, the control unit 301 further controls the wireless communication unit 302 so as to transmit the print data to the printer by using the wireless connection (step S408). When the transmission of the print data has been completed, the control unit 301 returns the process to step S401. The print data transmitted here is, for example, the image content included in the screen 500 when a printer search operation is performed on the screen 500 shown in FIG. 5A. Note that if the printer search operation is performed by a method not in accordance with the screen 500 shown in FIG. 5A, the print data may be unconfirmed at the point of step S408. In this case, in step S408, the control unit 301 may cause the display unit 303 to display a menu to prompt the user to select the print target. Additionally, in this case, the control unit 301 may cause the process to return to step S401 without transmitting the print data if the print target data is not confirmed over a predetermined time after the menu has been displayed or if the user has performed a cancel operation. Furthermore, instead of displaying a menu to accept a selection of the print target data in step S408, the control unit 301 may perform control so that the menu is displayed before the wireless LAN connection processing in step S407. In this case, the control unit 301 may perform control so that the wireless communication unit 302 will stand by without executing the wireless LAN connection processing in step S407 until the print data is confirmed.

Figure 9:
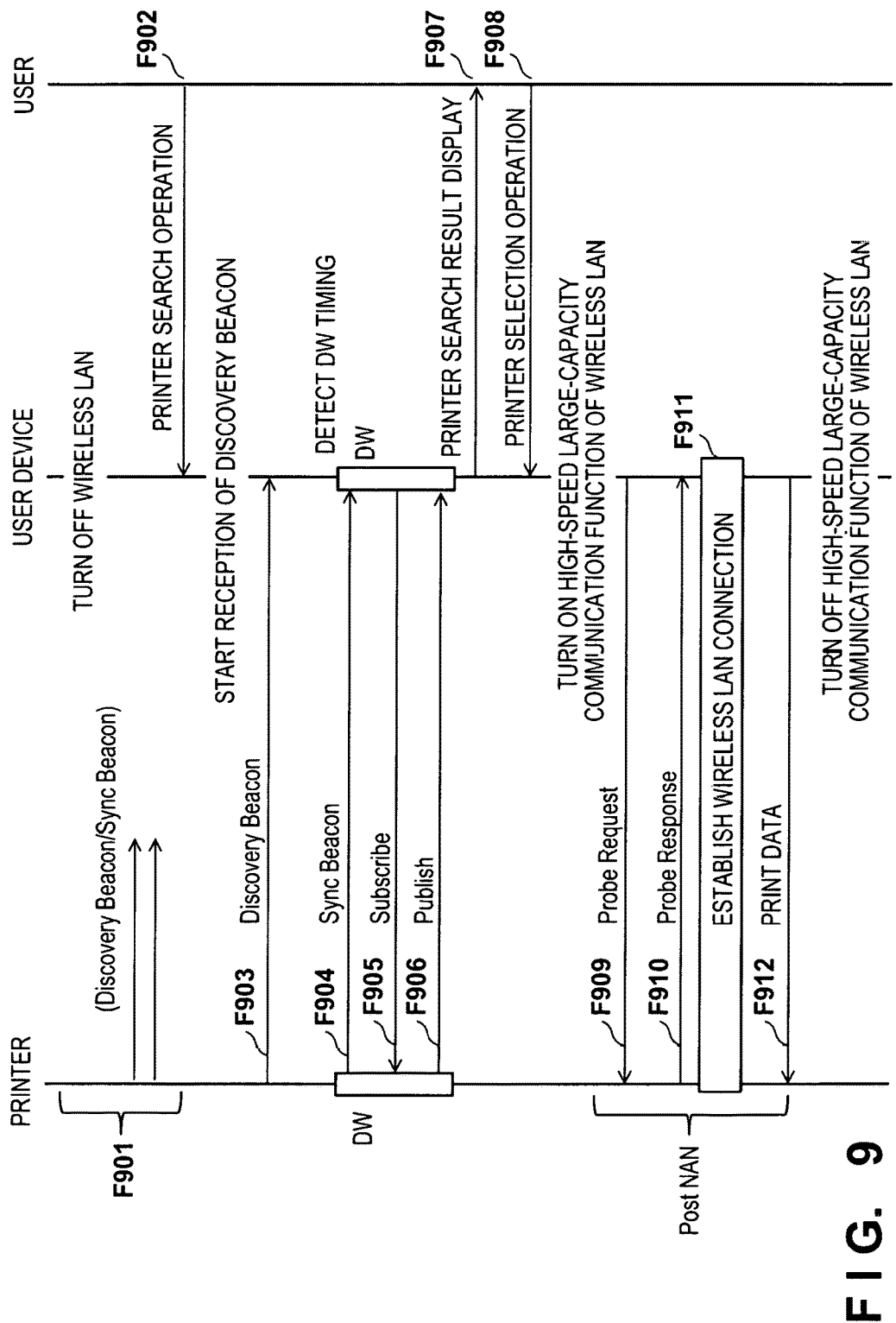
FIG. 9 is a sequence chart showing an example of the sequence of processes between the user device and a printer.

An example of the processing sequence in the wireless communication system will be described next with reference to FIG. 9. At the starting point of FIG. 9, the printer 101 has repeatedly transmitted the Discovery Beacon and the Sync Beacon and the wireless LAN of the user device has been set to the OFF state (F901, step S401). Subsequently, the user executes a printer search operation on the user device 100 (F902). The user device 100 responds to the printer search operation, receives the Discovery Beacon and the Sync Beacon (F903, F904), detects the DW period, and joins the NAN cluster (steps S402 and S403). The user device 100 searches for a printer (step S404) by transmitting a Subscribe message (F905) and receiving a Publish message (F906) in the DW period. The user device 100 displays the printer search result (F907) and stands by for the user to make a printer selection operation (step S406). Upon detecting the printer selection operation (F908), the user device 100 turns on the high-speed large-capacity communication function of the wireless LAN and transmits a Probe Request to the printer 101 (F909). Subsequently, the user device 100 receives a Probe Response (F910), establishes connection with the printer 101 for the high-speed large capacity communication of the wireless LAN (F911, step S407), and transmits the print data (F912, step S408). When the transmission of the print data has been completed, the user device 100 turns off the wireless LAN (step S401) and returns to a standby state for a printer search operation by the user (step S402). Note that the Post NAN connection in F909 to 912 can be established as a connection between the wireless LAN of the 101 serving as the AP and the wireless LAN of the user device 100 serving as the STA. However, the present invention is not limited to this. For example, the user device 100 and the printer 101 may acquire pieces of information necessary for a P2P connection such as a P2P device role and the like by the attribute ID=0x06 of the NAN Attribute and use the acquired pieces of information to execute a P2P connection by the wireless LAN. The transmission of print data may also be performed by using a NAN connection without using the Post NAN connection. That is, instead of establishing a wireless LAN connection, the user device 100 and the printer 101 may exchange communication timing information by the NAN Attribute, maintain the NAN connection, and transmit the print data in a period other than the DW period.

As described with reference to FIG. 9, the user device 100 turns on the high-speed large-capacity communication function of the wireless LAN in only the period after the printer selection operation until the completion of print data transmission, and this function is turned off in other periods. The user device 100 also does not turn on the high-speed large-capacity communication function of the wireless LAN if there are no printers present nearby at the time of the printer search operation. That is, among the wireless LAN functions of the user device 100, a function with comparatively high power consumption is turned on in only in a period in which a connection with a printer is required and in which a connection with a printer is possible. The user device 100 can detect a connection partner apparatus such as a printer without using other wireless communication methods, such as BLE and the like, which cannot share the communication circuit. Hence, the user device 100 of this processing example can establish a wireless connection with a communication partner apparatus (for example, the printer 101) with low power consumption while suppressing the apparatus cost. In addition, the user device can perform large-capacity data transmission by subsequently switching the communication method.

Note that in this processing example, the user device 100 receives a NAN Attribute including a Service ID by an SDF transmitted during the DW period, and a printer is searched based on the value of this Service ID. However, in some cases, the NAN Attribute including the Service ID may be included in a Discovery Beacon or a Sync Beacon. Hence, in a case in which a Service ID is detected upon receiving a Discovery Beacon or a Sync Beacon, the user device 100 may add the TA and the Service ID included in the beacon to the printer search result 700. As a result, the user device 100 can discover a printer that is transmitting a Service ID by a Discovery Beacon or a Sync Beacon.

Figure 4:
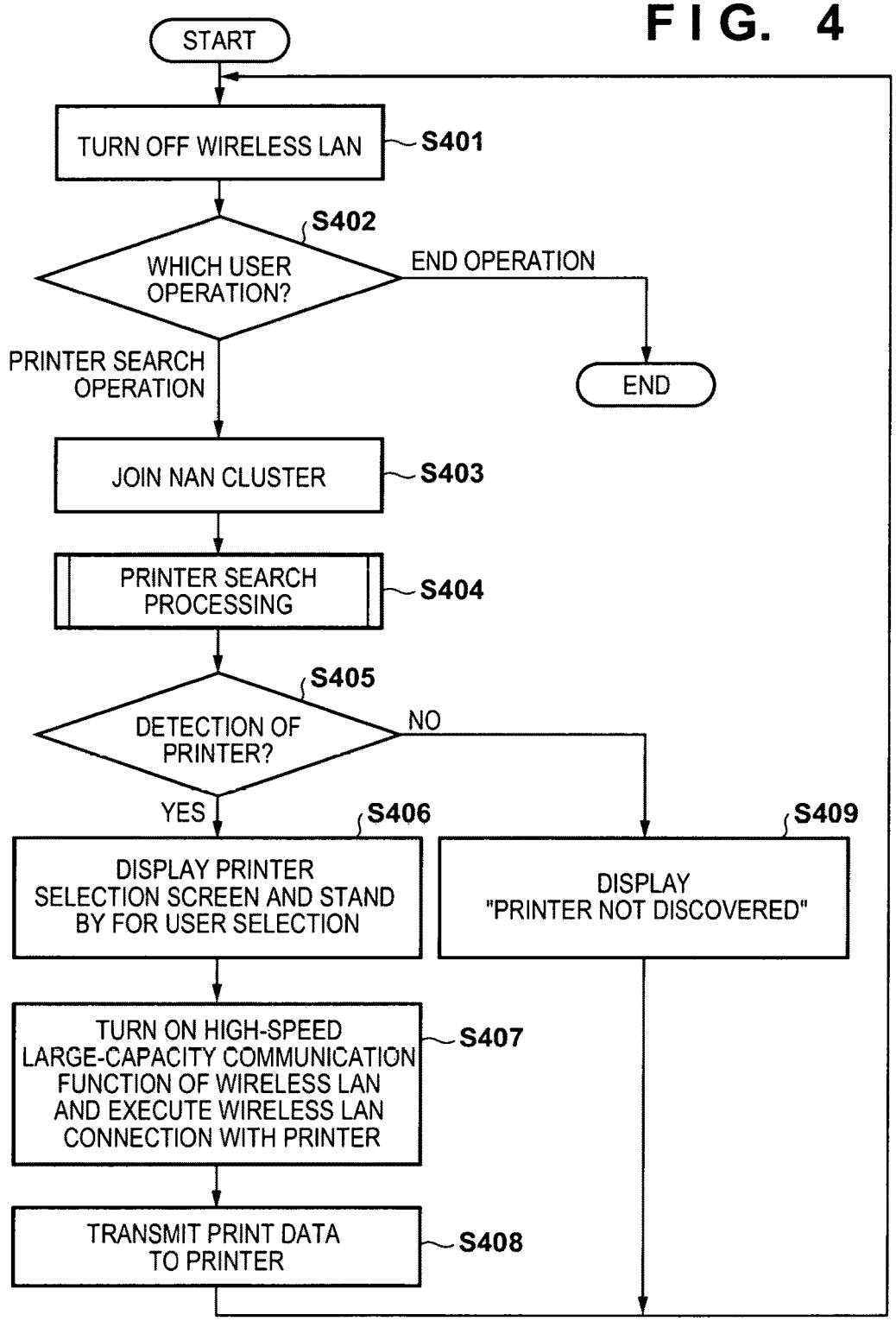
FIG. 4 is a flowchart showing an example of a processing procedure of a control unit.
Figure 5A:
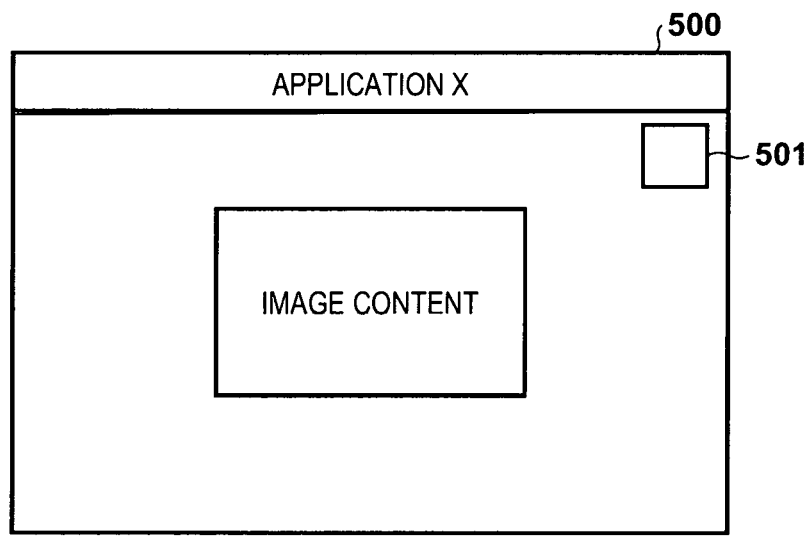
FIGS. 5A and 5B are views each showing an example of application screen display in the user device.
Figure 5B:
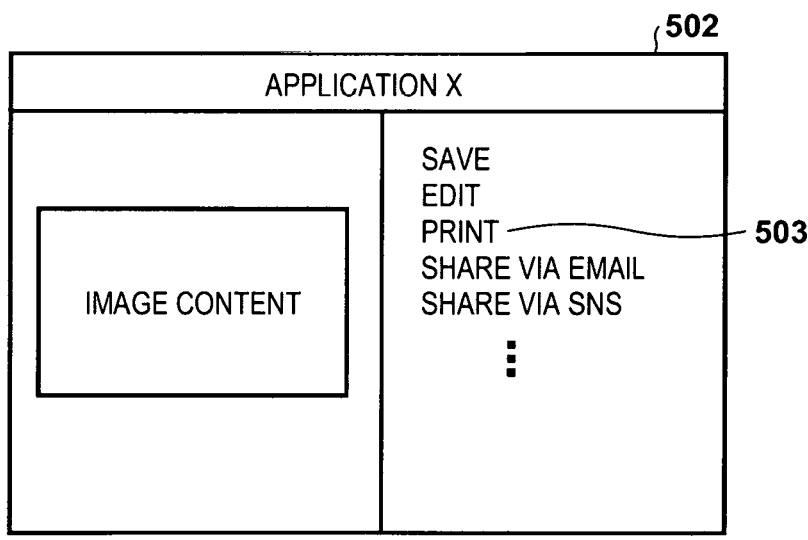

Note that in the above description, although it has been described that the processing of FIG. 4 is started in response to the start of the application X or the execution of a predetermined process such as the display of the image content in the application X, the present invention is not limited to this. For example, the processing of FIG. 4 may start in response to the powering on of the user device 100 or an operation to return from the sleep state. In addition, although the above description assumed that the printer search operation by the user is to be explicitly executed, it is not limited to this. For example, the control unit may assume that a printer search operation has been performed when a condition for starting the above-described processing of FIG. 4 is satisfied and constantly maintain a NAN-cluster joined state while the user device 100 is operating. In this case, the control unit 301 may execute the printer search operation of step S404 in response to, for example, the confirmation of the print data. In addition, it may be set so that the processes of step S604 to S606 of the printer search operation in step S404 are executed as background processing, and the control unit 301 may execute the process of step S405 at the point when the print data is confirmed.

Processing Example 2

Figure 10A:
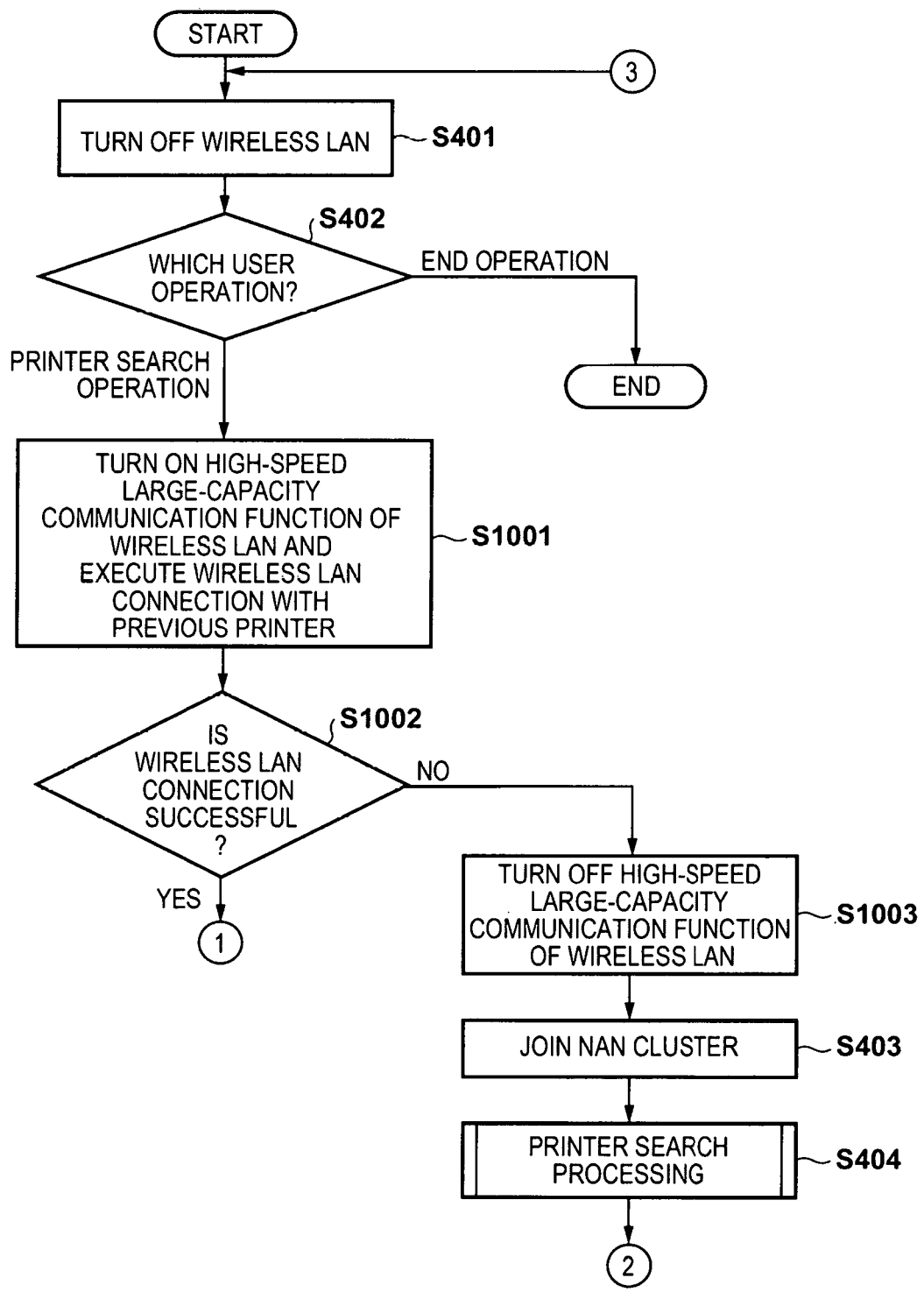
FIGS. 10A and 10B illustrate flowcharts showing an example of a processing procedure of the control unit.
Figure 10B:
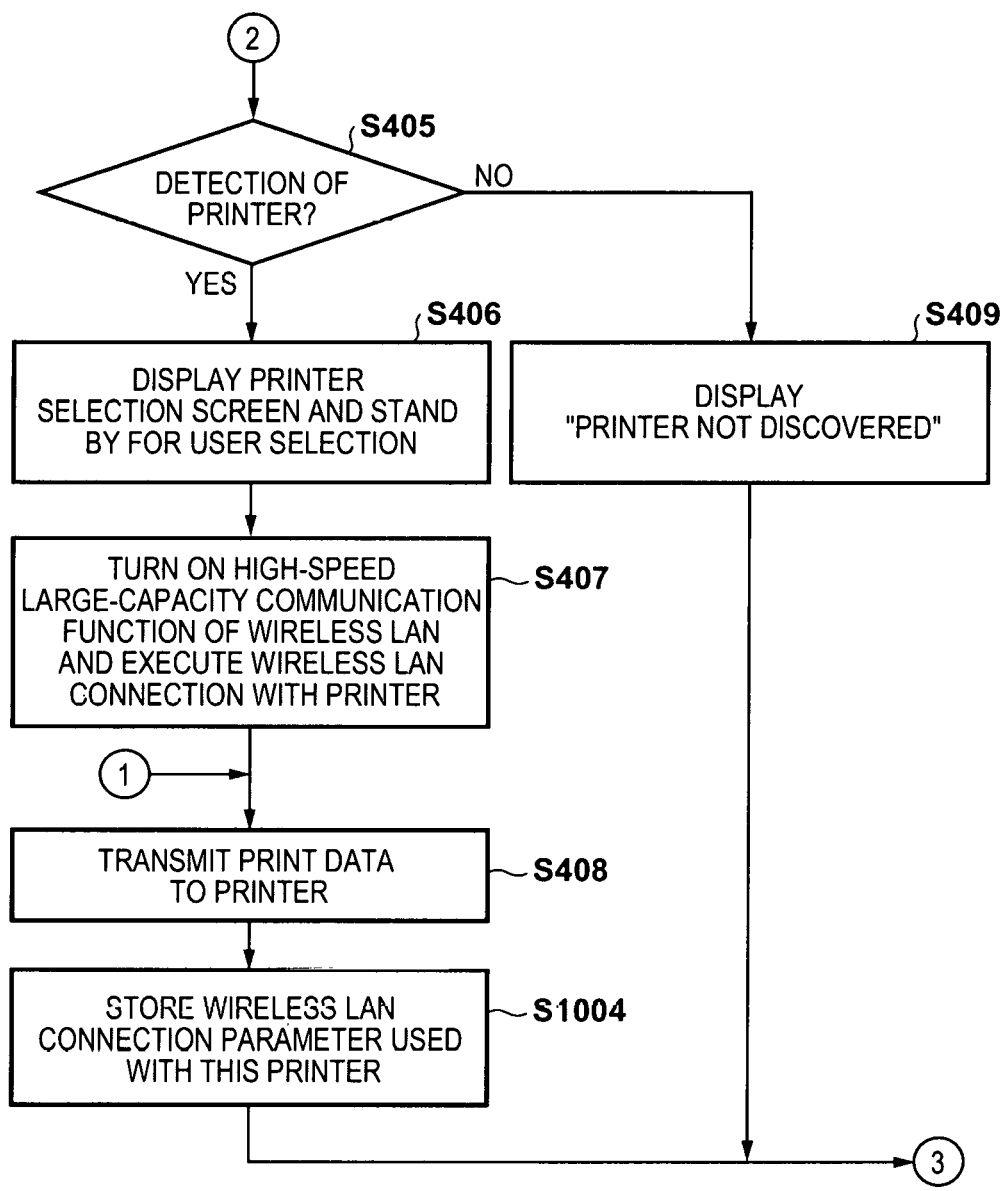

In this processing example, when there is a printer with which communication by using the high-speed large-capacity communication function of the wireless LAN has been executed previously, the user device 100 first tries to connect to this printer and executes processing in the same manner as FIG. 4 when it has failed to establish the connection. On the other hand, if the connection with the printer with which communication by using the high-speed large-capacity communication function of the wireless LAN has been executed previously is successful, the user device 100 transmits the print data to the printer without executing the processing in the manner of FIG. 4. As a result, an unnecessary printer search operation need not be performed. The procedure of this processing will be described with reference to FIGS. 10A and 10B.

Upon detecting a printer search operation in step S402, the control unit 301 turns on the high-speed large-capacity communication function of the wireless LAN and tries to connect (step S1001) with the printer with which it had connected by the high-speed large-capacity communication function in the past. Here, if there are a plurality of printers with which the user device had connected in the past, the control unit may preferentially try to connect to the printer with which it had most recently established a connection previously. Alternatively, a plurality of previously connected printers may be displayed so that the user may select the printer to try establishing a connection with. If the connection in step S1001 is successful (YES in step S1002), the control unit 301 transmits the print data to the printer by this connection (step S408). On the other hand, if the connection is not successful (NO in step S1002), the control unit 301 turns off the high-speed large-capacity communication function of the wireless LAN (step S1003). The control unit 301 subsequently searches for a printer by the NAN in the same manner as the processing example 1, establishes connection with the discovered printer by the high-speed large-capacity communication function, and transmits the print data (steps S403 to S408). After transmitting the print data to the printer and before turning off the wireless LAN, the control unit 301 stores the connection setting information which was used to establish the connection with the printer (step S1004).

In this manner, in the processing example 2, in a case in which the user device is present in a location where communication with a previously connected printer is possible, the user device 100 omits the processes of steps S403 to S407. As a result, the user device 100 can establish connection with a printer and perform printing in a shorter time. Since the printer selection operation by the user can also be omitted, the user operation can be simplified. Note that information such as the printer name acquired by the NAN Attribute in the manner of the printer search result 700 can be added to the information which is to be stored in step S1004.

Figure 11A:
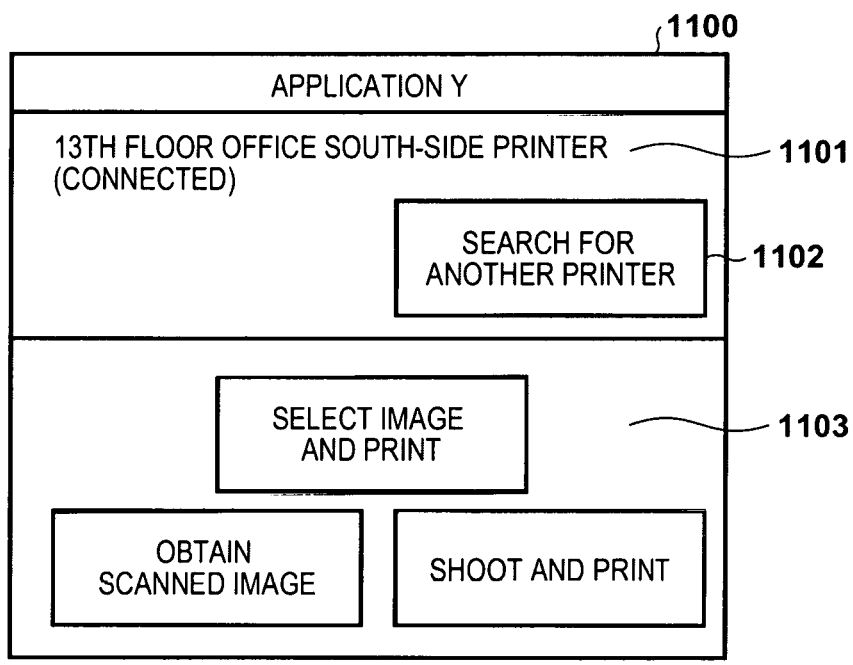
FIGS. 11A and 11B are views each showing an example of application screen display in the user device.

Here, instead of the screen 500 shown in FIG. 5A, a screen 1100 shown in FIG. 11A can be used as the screen display during the standby for the printer search operation in step S402. Although the user device 100 connects to the printer after the content is selected in the application X of FIG. 5A, the content is selected after the user device 100 has connected to the printer in an application Y of FIG. 11A. The control unit 301 can recognize that a printer search operation has been made by, for example, the activation of the application Y of FIG. 11A in step S402. The control unit 301 then tries to establish a connection with the previously connected printer (step S1001), and if the connection is successful (YES in step S1002), the control unit displays the information of the connected printer on the screen, in the manner of information 1101. At this time, for example, the printer name and the like may be displayed as the information 1101 by referring to the information of the NAN Attribute stored in step S1004.

The print data that is transmitted in step S408 is determined based on the contents selected by the user from a menu 1103. Note that instead of transmitting the print data to the printer by the established connection, it may be arranged so that the user device 100 receives, from the printer, content data such as an image scanned by the printer.

Figure 11B:
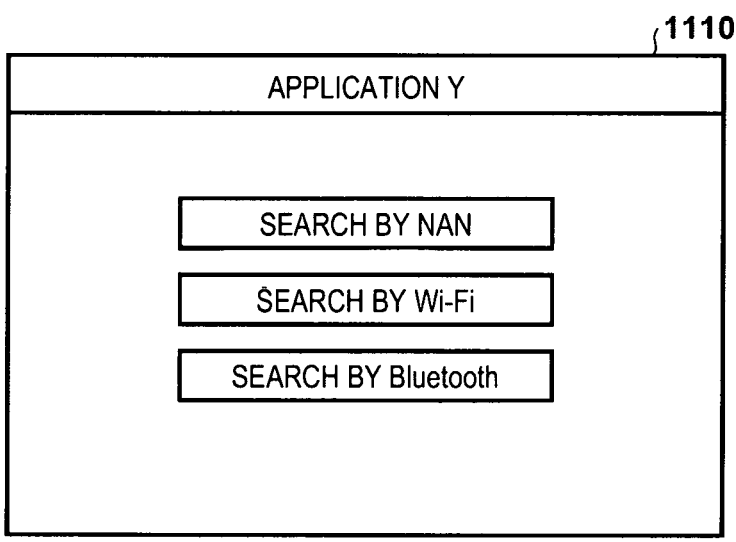

In addition, the user device 100 may provide a button 1102 on the screen 1100 and may execute the printer search processing by shifting the process to step S403 when an operation to search for another printer is detected. Furthermore, the user device 100 may display a screen 1110 shown in FIG. 11B before the start of the printer search processing and may perform the process of step S403 and its subsequent processes when the NAN is selected from the plurality of printer search methods.

Processing Example 3

Figure 12A:
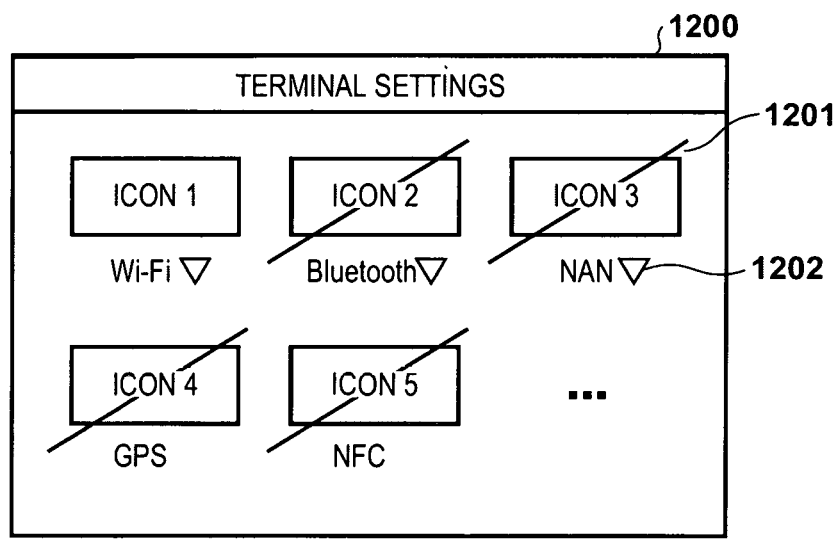
FIGS. 12A and 12B are views each showing an example of screen display for communication function enable/disable setting.
Figure 12B:
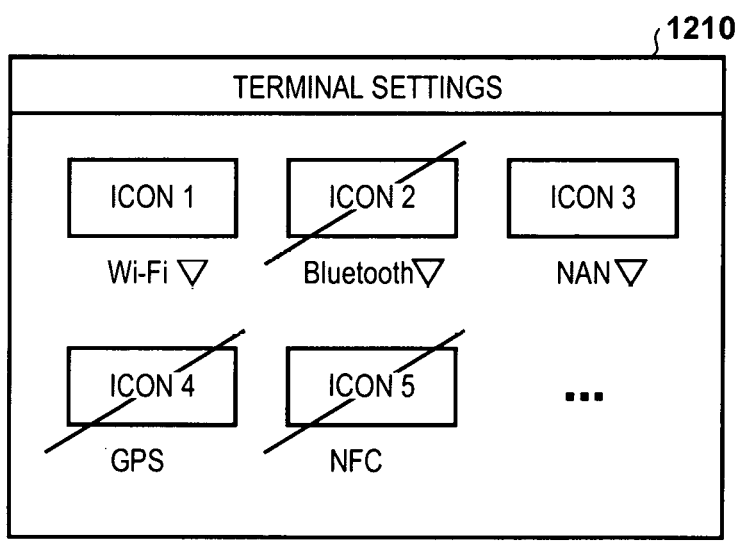

In this processing example 3, the user device 100 is arranged to include a terminal setting menu for the enable/disable setting of the NAN function and for executing a search for a NAN device. In the processing example, when the control unit 301 stands by for a printer search operation in step S402 of FIG. 4, the control unit performs control so as to open the terminal setting menu, as shown in a screen 1200 of FIG. 12A, in accordance with a predetermined operation. For example, in a case in which the user device 100 is a smartphone, control to open the terminal setting menu as shown in the screen 1200 of FIG. 12A is executed by flicking the upper portion of the screen 500 shown in FIG. 5A. The user device 100 may also be arranged so that the terminal setting menu will be opened by another method, for example, such as a method of displaying a button corresponding to the terminal setting menu on the screen 500 of FIG. 5A and opening the terminal setting menu when this button is tapped. Note that the screen 1200 is merely a display example of the terminal setting menu and another display of presenting similar kind of information may be performed.

In the screen 1200, an "icon 3" is an icon indicating the NAN, and the enable/disable setting of the NAN function in the user device 100 is changed each time it is detected that this "icon 3" has been tapped. For example, the icon 3 is displayed intact in an enabled state as shown in a screen 1210, and display is performed in a state in which a diagonal line 1201 is superimposed on the icon 3 in a disabled state as shown in the screen 1200. This allows the control unit 301 to present to the user whether the NAN function is currently set to an enabled state or a disabled state. Note that the screen 1200 and the screen 1210 are merely examples, and the enable/disable state of the NAN function can be presented by another arbitrary display method such as a method of executing the display by graying out the icon. For example, the control unit 301 can store information indicating the enable/disable state of NAN function in the memory 306, and the control unit can advance the process to step S409 without advancing to step S403 if the NAN function is set to a disabled state when the execution of the printer search operation is detected in step S402 of FIG. 4. In this case, in step S409, the control unit 301 may present, to the user, information indicating the disabled state of the NAN function as the reason why a printer has not been discovered. Furthermore, in this case, the control unit 301 may prompt the user to enable the NAN function by executing pop-up display of the screen 1200 in step S409.

The control unit 301 can allow the enable/disable setting of the high-speed large-capacity communication of the wireless LAN to be changed by an "icon 1" shown on the screen 1200. In this case, the control unit 301 stores the information indicating the enable/disable setting of the high-speed large-capacity communication of the wireless LAN. If the high-speed large-capacity communication function of the wireless LAN is set to a disabled state, the control unit 301 may end the processing in step S407 of FIG. 4 without turning on this function. In this case, the control unit 301 may display, to the user, the fact that the high-speed large-capacity communication of the wireless LAN is set to a disabled state as the reason for the high-speed large-capacity communication function of the wireless LAN not being turned on. The control unit 301 may use the same icon to present information or accept a switching operation of the enable/disable setting of the NAN function and the enable/disable setting of the high-speed large-capacity communication function of the wireless LAN. A button 1202 or a set of characters representing the NAN function on the screen 1200 may be shared with the high-speed large-capacity communication function of the wireless LAN. That is, the control unit 301 may accept, by the button 1202, a selection based on the type of function such as the NAN function and the high-speed large-capacity communication function of the wireless LAN, and execute control to switch the enable/disable setting of the selected function in response to the tapping of the icon.

Note that in case in which the button 1202 or the set of characters representing the NAN function is tapped on the screen 1200, the control unit 301 may determine that the printer search operation has been performed and perform control to execute the process of step S403 and the subsequent processes of FIG. 4. That is, the control unit 301 can execute the process of step S403 and the subsequent processes of FIG. 4 in response to the enablement of the NAN function, that is, the execution of an operation to start a search for nearby devices by the NAN.

According to this processing example, it is possible to suppress radio waves for communication by the NAN or the wireless LAN from being transmitted from a user device against the intention of the user in places, such as on the plane or in a hospital, where the transmission of radio waves need to be suppressed.

Note that in each of the above-described processing examples exemplified a search for an apparatus which provides a predetermined service is executed based on the Service ID included the NAN Attribute. However, the present invention is not limited to this. For example, the search for the apparatus which provides a predetermined service may be executed based on the value of the Service Info included in the NAN Attribute. In addition, although determination as to whether the information of the Service ID or that of the Service Info matches a predetermined hash value held by the user device 100 has been performed in each of the above-described processing examples, the present invention is not limited to this. That is, a determination may be made based on another criterion such as whether the information of the Service ID or that of the Service Info is a predetermined value which is different from the hash value.

According to each of the above-described processing examples, among the plurality of wireless communication methods in which at least a part of the communication circuit can be shared, the user device 100 uses a first method which has low-power consumption to search for another apparatus that provides a predetermined service. Subsequently, based on the search result, the user device 100 performs communication with the discovered other apparatus by establishing a connection with the apparatus by a second method which has relatively high-power consumption and is capable of high-speed large-capacity communication. This allows the user device 100 to discover a communication partner apparatus with low power consumption while suppressing the apparatus cost. For example, since the physical layer configuration and the packet structure of the NAN and those of the high-speed large-capacity communication of the wireless LAN are the same, the component cost of the user device 100 and that of the printer 101 can be reduced compared to a case which uses another wireless communication method, such as BLE or the like. That is, a wireless chip that has a wireless LAN communication function may be able to support NAN by a firmware update. The component cost does not increase in this case. In addition, since the NAN is an intermittent communication method, the battery consumption on the side of the user device can also be suppressed in the same manner as BLE.

Each of the above-described processing examples described that the control unit 301 which serves as a processor executes the processing of FIG. 4 and the like by executing a program stored in a storage device such as the memory 306. However, the present invention is not limited to this. For example, some or all of the processing operations may be performed by dedicated hardware. Furthermore, for example, some or all of the above-described processing examples may be executed under the control of a processor or the like included in the wireless communication unit 302.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-164597, filed Aug. 29, 2017, which is hereby incorporated by reference herein in its entirety.

What is claimed is:

1. A communication apparatus comprising:
one or more processors; and
one or more memories including instructions that, when executed by the one or more processors, cause the communication apparatus to:
execute a first communication based on a Neighbor Awareness Network (NAN);
search for one or more printers by determining, in a case where a Publish message including a first NAN Attribute in which a Service ID and Service Info are included is received by the first communication, whether a value of the Service ID or a value of the Service Info of the first NAN Attribute is a value indicating a print service;
execute a second communication by a wireless LAN to transmit print data to at least one of the one or more printers discovered in the search using the first communication; and
control, in a case where a second NAN Attribute including a BSSID used for establishing a connection of the wireless LAN is received by the first communication, the communication apparatus to transmit, by the second communication, a probe request designating the BSSID as a destination and then establish the connection of the wireless LAN, and to transmit, to the at least one of the one or more printers discovered in the search using the first communication, print data via the established connection of the wireless LAN.

2. The communication apparatus according to claim 1, wherein the execution of the instructions further causes the communication apparatus to:
control the state of the communication apparatus so as to set one of a first state in which the second communication is available and a second state in which the second communication unit is not available,
wherein the communication apparatus sets the communication apparatus in the second state while executing the search for the searching for the one or more printers by the first communication.

3. The communication apparatus according to claim 2, wherein the communication apparatus sets the communication apparatus in the first state based on discovery of the one or more printers by the first communication.

4. The communication apparatus according to claim 1, wherein the execution of the instructions further causes the communication apparatus to:
display a list of the one or more printers discovered by the communication apparatus.

5. The communication apparatus according to claim 4, wherein the communication apparatus displays the list based on information included in the first NAN Attribute and/or the second NAN Attribute transmitted by the one or more printers discovered by the communication apparatus.

6. The communication apparatus according to claim 5, wherein the communication apparatus displays information included in the Service Info included in the first NAN Attribute.

7. The communication apparatus according to claim 4, wherein the communication apparatus searches for the one or more printers for the print service and one or more other apparatuses for another service by the first communication, and
the communication apparatus displays a list of the discovered one or more printers and the discovered one or more other apparatuses by dividing the discovered printers and the discovered apparatuses in accordance with the service.

8. The communication apparatus according to claim 1, wherein the execution of the instructions further causes the communication apparatus to:
store, in a case where the communication apparatus executes communication by the second communication, connection setting information used in the communication,
wherein the communication apparatus performs control so as to establish the connection in the wireless LAN by the second communication by using the connection setting information stored in the communication apparatus, before executing the search for the one or more printers by the first communication.

9. The communication apparatus according to claim 1, wherein the execution of the instructions further causes the communication apparatus to:
accept an operation by a user,
wherein the communication apparatus starts the search for one or more printers by the first communication in response to accepting a predetermined operation related to the print service.

10. The communication apparatus according to claim 9, wherein the predetermined operation comprises one of an operation to indicate the start of the print service, an operation to activate a predetermined application, an operation to start a search for a printer which provides the print service, an operation to power on the communication apparatus, and an operation to cause the communication apparatus to return from a sleep state.

11. The communication apparatus according to claim 1, wherein the communication apparatus searches for the one or more printers while a setting to enable the first communication has been made and does not search for one or more printers while the setting to enable the first communication has not been made.

12. The communication apparatus according to claim 1, wherein the communication apparatus does not execute communication using the second communication when a printer is not discovered by the first communication.

13. The communication apparatus according to claim 1, wherein the first communication is communication in which lower power is consumed than in the second communication.

14. The communication apparatus according to claim 1, wherein the first communication and the second communication are both compliant with the IEEE802.11 standard series.

15. The communication apparatus according to claim 1, wherein the communication apparatus executes the second communication by one of the communication apparatus and a communication partner apparatus which operates as an access point in a wireless LAN and the other which operates as a station in the wireless LAN.

16. The communication apparatus according to claim 1, wherein the communication apparatus executes the second communication by the communication apparatus and a communication partner apparatus operating as stations in a wireless LAN and connecting to an external access point.

17. The communication apparatus according to claim 1, wherein the communication apparatus executes the second communication so that the communication apparatus and a communication partner apparatus communicate based on the Wi-Fi Direct standard.

18. The communication apparatus according to claim 1, wherein the communication apparatus executes the second communication in a period outside a Discovery Window in the Neighbor Awareness Network (NAN).

19. A method of controlling a communication apparatus that executes a first communication based on a Neighbor Awareness Network (NAN) and executes a second communication by a wireless LAN, the method comprising:
searching for one or more printers by determining, in a case where a Publish message including a first NAN Attribute in which a Service ID and Service Info are included is received by the first communication, whether a value of the Service ID or a value of the Service Info of the first NAN Attribute is a value indicating a print service; and
controlling, in a case where a second NAN Attribute including a BSSID used for establishing a connection of the wireless LAN is received by the first communication, the communication apparatus to transmit, by the second communication, a probe request designating the BSSID as a destination and then establish the connection of the wireless LAN, and to transmit, to the at least one of the one or more printers discovered in the search using the first communication, print data via the established connection of the wireless LAN.

20. A non-transitory computer-readable storage medium that stores a program for causing a computer comprised in a communication apparatus that executes a first communication based on a Neighbor Awareness Network (NAN) and executes a second communication by a wireless LAN:
search for one or more printers by determining, in a case where a Publish message including a first NAN Attribute in which a Service ID and Service Info are included is received by the first communication, whether a value of the Service ID or a value of the Service Info of the first NAN Attribute is a value indicating a print service; and
control, in a case where a second NAN Attribute including a BSSID used for establishing a connection of the wireless LAN is received by the first communication, the communication apparatus to transmit, by the second communication, a probe request designating the BSSID as a destination and then establish the connection of the wireless LAN, and to transmit, to the at least one of the one or more printers discovered in the search using the first communication, print data via the established connection of the wireless LAN.

21. The communication apparatus according to claim 1, wherein the communication apparatus performs control to transmit the probe request designating the BSSID as the destination in a case where information indicating a transmission source of the first NAN Attribute matches information indicating a transmission source of the second NAN Attribute.

22. The communication apparatus according to claim 1, wherein the communication apparatus performs control, in a case where the communication apparatus transmits the probe request and then receives a probe response that is a response to the probe request from the at least one of the one or more printers discovered in the search, to establish the connection of the wireless LAN with the at least one of the one or more printers that transmitted the probe response.

* * * * *